United States Patent
Ryrko et al.

(10) Patent No.: US 6,374,671 B1
(45) Date of Patent: Apr. 23, 2002

(54) METHOD OF STIMULATING AN OSCILLATOR CONTROL FOR CAPACITIVE MEASUREMENT OF STRENGTH, ACCELERATION AND/OR ROTATION SPEED

(75) Inventors: Bruno Ryrko, Denzlingen; Günter Spahlinger, Stuttgart; Walter Gutmann, Münstertal, all of (DE)

(73) Assignee: Litef GmbH (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/254,502
(22) PCT Filed: Jun. 2, 1997
(86) PCT No.: PCT/EP97/03257
§ 371 Date: Oct. 26, 1999
§ 102(e) Date: Oct. 26, 1999
(87) PCT Pub. No.: WO98/10258
PCT Pub. Date: Mar. 12, 1998

(30) Foreign Application Priority Data

Sep. 4, 1996 (DE) .......................................... 196 35 923

(51) Int. Cl.$^7$ ................................................ G01P 9/04
(52) U.S. Cl. .................................................. 73/504.12
(58) Field of Search ........................ 73/504.12, 504.13, 73/504.14, 504.15, 504.16, 862.59; 331/154, 156

(56) References Cited

U.S. PATENT DOCUMENTS 5,859,368 A * 1/1999 Cargitle .................... 73/504.14
5,959,206 A * 9/1999 Ryrko et al. .............. 73/504.12

FOREIGN PATENT DOCUMENTS

DE 4430439 6/1996
EP 623824 11/1994

* cited by examiner

*Primary Examiner*—John E. Chapman
(74) *Attorney, Agent, or Firm*—Elliott N. Kramsky (57) ABSTRACT

For the drive excitation, the method for the capacitive drive excitation of oscillators in sensors for the capacitive measurement of force, acceleration and, in particular, rotation rates according to the Coriolis principle, provides according to the invention for the use of high-frequency constant-amplitude pulse packets with no DC component, the width or phase angle of which can be adjusted in order to keep the oscillator speed constant, for the purpose of resetting or correcting tolerances. As an alternative, the method may also be configured in such a way that, in the case of oscillators with pairwise excitation electrodes which are symmetrical with respect to the rotation axis, equal constant-amplitude HF voltages are applied, the frequency of which is chosen to be substantially higher than the natural frequency of the oscillator, in which case a particular resulting force of attraction on the oscillator is brought about by shifting the phase angle between the drive voltages and, in the case of rotation rate sensors working according to the closed-loop principle, system resetting can also be ensured. By virtue of the invention, problems with coupling the excitation signal into the read channel of a micromechanical oscillator system can be brought well under control.

6 Claims, 9 Drawing Sheets

METHOD OF STIMULATING AN OSCILLATOR CONTROL FOR CAPACITIVE MEASUREMENT OF STRENGTH, ACCELERATION AND/OR ROTATION SPEED

BACKGROUND

1. Field of the Invention

The present invention relates to methods for capacitive drive excitation of oscillators for sensors for capacitive measurement of physical quantities such as force, acceleration and rotation rate by determination of Coriolis forces. More particularly, this invention pertains to such a method in which a sequence of electrical pulses, tuned to the natural frequency of the oscillator is applied to a drive capacitor connected to the sensor. Preferably, but not exclusively, plate-like oscillators may be employed. The sensors employed are of the type in which frequency-analog-type excitation methods and/or spin preserving measuring principles are employed that accept rotation or pulses, and in which variations in rotation and pulses are picked up during reading.

2. Description of the Prior Art

The Coriolis principle is generally considered as being well known. Coriolis rotation rate sensors currently available on the market employ piezoelectric effects for both the drive and readout systems. A recent design of such a sensor, to which reference will be made below, is described in U.S. Pat. No. 5,959,206.

A general problem of sensors of this type is avoidance of coupling of the drive signal into the readout. Structural variations within tolerances of the oscillating structures or the electrode layers (through which attractive forces that only act exactly orthogonally to the oscillator surface in the ideal case) cause part of the excitation signal to become coupled into the read channel. Since both signals (i.e. the read signal and an unavoidable noise signal due to the above-mentioned inaccuracies) occur with the same frequency, it is necessary to compensate for this error. However, compensation is generally temperature-dependent. A further complication is the fact that the amplitudes to be capacitively read fall in the submicrovolt range, several orders of magnitude beneath those of the exciting signals. This results in stability problems for a zero-point. High attenuations are required to distinguish the drive pulses from the extremely-weak read signals. Due to this, isolation by screening, design symmetry and electronic measures (e.g. separate earth loops for driving and reading (a known principle to avoid the problem that the relatively strong drive signals are induced into the measuring, filtering, amplification and decoding path of the read signals), common-mode rejection in the signal amplification, etc.) are insufficient for more accurate sensors.

Arrangements for sensors of this type have been proposed that employ sensor elements produced micromechanically, preferably from silicon, with capacitive pickoffs (e.g. the above-mentioned United States patent. An electrostatic actuator generally provides the drive. Cross-talk from the excitation to the read electronics poses a problem as well for such known arrangements.

As a solution, an electromagnetic drive has already been proposed in the literature. However, it demands an undesirably large amount of power, greatly increasing the loss of the overall arrangement. Other known solutions employ carrier-frequency methods for reading. Such methods require considerable outlays for the electronics.

Problems posed by known electrostatic drive methods are presented below with reference to FIGS. 4(a) and 4(b). Reference is also made to FIG. 4 of the above-referenced U.S. Pat. No. 5,959,206 which is hereby incorporated by reference.

Figure 4A:
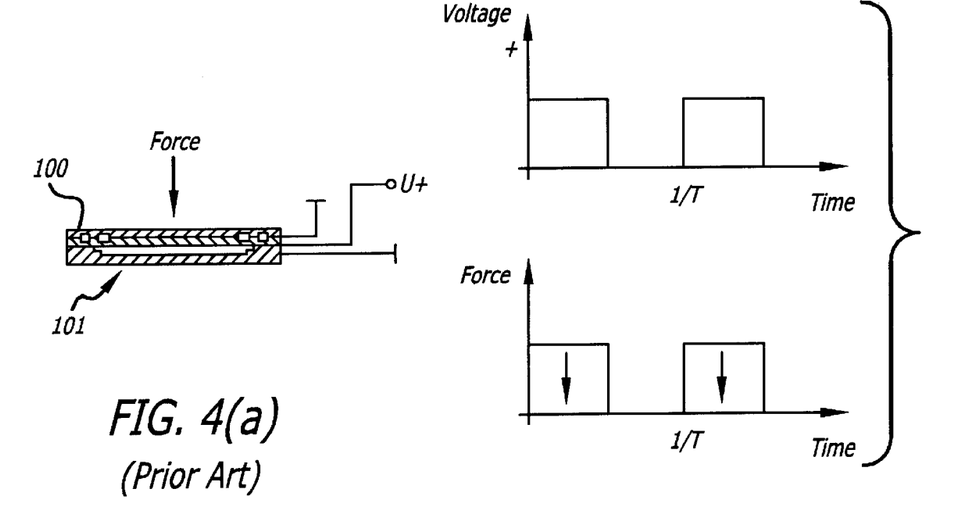
FIGS. 4(a) and 4(b) illustrate the configuration of an electrostatic arrangement of linear oscillators as discussed above.
Figure 4B:
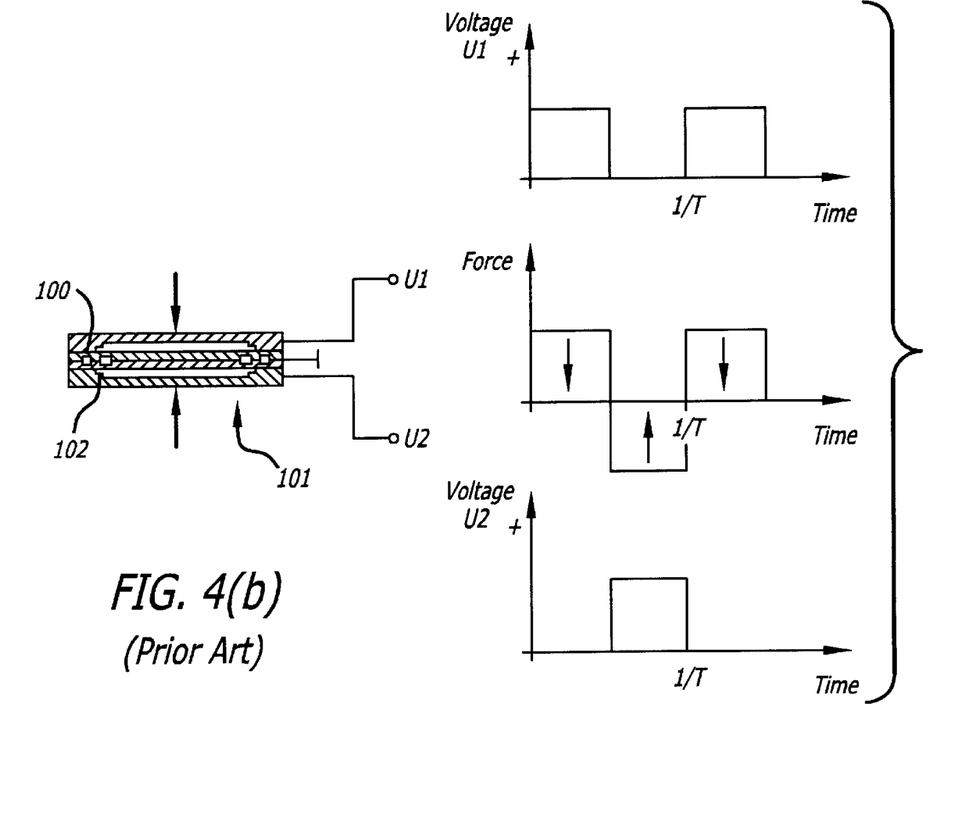

For the single-sided excitation of a plate-like oscillator 101 (asymmetric arrangement of FIG. 4(a)) having a top electrode 100 in the example presented (or for two-sided excitation via two electrodes 100, 102 per the symmetric arrangement of FIG. 4(b) or FIG. 4 of the above-referenced German patent application), the time profile of the excitation voltages, tuned to the natural frequency of the oscillator 101, and the resulting forces or force pulses are represented by diagrams to the right of FIGS. 4(a) and 4(b) respectively. Arrows of the relevant force/time diagram indicate that, due to the known second-order relationship between drive voltage and resulting forces, only attractive forces are possible between the electrode(s) (indicated only schematically) 101, 100, 102 and the oscillator. In the example of FIG. 4(a) (i.e., in the case of single-sided excitation), it is thus possible to employ only one half-cycle of the exciting voltage for the drive. For two-sided excitation, the time profiles of the exciting voltages and the resulting forces, illustrated as a function of time in FIG. 4(b), show that the oscillator 101 is excited by the time sequence of attractive forces from the two electrodes 100, 102.

In both cases, the pulsed excitation of the oscillator 101 requires the use of relatively high voltages. Portions of such voltages are unavoidably coupled to the read channel electrostatically or by DC coupling.

In order to measure rotation rates within a range of a few degrees per second, the read signals are, as mentioned, many orders of magnitude less than the oscillator excitation signals (voltage pulses). Although coupling to the read signal may be kept small through special layout of the conductors, an alternative in the range of 100 dB or more is very difficult to achieve.

SUMMARY AND OBJECTS OF THE INVENTION

It is therefore an object of the present invention to provide a method for capacitive drive excitation of (preferably plate-like) oscillators of sensors for measurement of rotation rates in which the above-mentioned problem of coupling from the excitation signal to the read channel may be reliably avoided.

The present invention addresses the foregoing by providing, in a first aspect, a method for capacitive drive excitation of an oscillator for capacitive measurement of physical quantities such as force, acceleration and/or rotation rate by determination of Coriolis forces. Such method includes the step of applying a sequence of electrical pulses, tuned to the natural frequency of the oscillator, to a drive capacitor connected to the oscillator. High-frequency pulse packets of constant-amplitude voltage are employed for the drive excitation.

An applied alternating voltage of the pulse packets has a substantially higher frequency than the natural frequency of the oscillator(s), and is preferably free of DC and/or low-frequency voltage components. By adding or subtracting one or more periods of a square-wave voltage in the individual HF pulse packets, it is possible to vary the pulse width of the respective pulse packets, or the pulse phase, using processors to control oscillator excitation.

In a second aspect, the invention provides a method for capacitive drive excitation of an oscillator in a sensor for capacitive measurement of physical quantities such as force, acceleration and/or rotation rate by the determination of Coriolis forces. Such method includes the step of applying a sequence of out-of-phase electrical pulse pairs tuned to the natural frequency of the oscillator to an arrangement of at least two excitation electrodes which is pairwise symmetrical with respect to the oscillation axis. The same constant-amplitude HF voltage is applied to the pair of excitation electrodes. The frequency of the voltage is substantially higher than the natural frequency of the oscillator. The pulse pairs are produced out-of-phase as HF pulse packets by controlled shifting of the phase of the HF voltage applied to one of the ex citation electrodes with respect to that applied to the other of the excitation electrode pair to produce a particular resultant force of attraction on the oscillator.

The latter aspect thus provides for application of the same alternating voltage to the two electrodes of the oscillator electrode pair. These voltages (of the same frequency) applied to the exciter electrodes are then shifted relative to one another in phase. If the excitation voltages are in-phase, then there will be no force component which excites oscillation. If the phase angles differ, there will be a resultant electrical attraction force.

This alternative has t he advantage that the loading conditions for the supply to the oscillation excitation are constant. This is especially the case when the phase angles of the exciter signals are shifted out-of-phase. A further advantage that results is comparatively good isolation of the signal frequency and noise contributions of the electrical drive. The supply is subjected to a high exciter frequency with high-frequency noise contributions filtered out.

According to an advantageous variant of the invention, the phase may be shifted either in discrete steps or continuously.

The preceding and other features and advantages of this invention will become further apparent from the detailed description that follows. Such description is accompanied by a set of drawing figures. Numerals of the drawing figures, corresponding to those of the written description, point to the features of the invention. Like numerals refer to like features throughout both the drawing figures and the written description.

DETAILED DESCRIPTION OF THE PREFERRED EMBODIMENT

According to the invention, it is possible to prevent the direct coupling of the excitation signal into the read signal of an oscillating sensor by employing a high-frequency signal in the form of pulse packets. As can be seen from referring to FIGS. 1(a) and 1(b) which correspond to FIGS. 4(a) and 4(b) for single-sided and double-sided excitation of an oscillator 101 respectively, a high-frequency square-wave voltage without DC voltage components is employed in accordance with the invention.

As the moments or forces exerted on the oscillator 101 depend upon the square of the applied voltage, the positive and negative half-cycles of the pulse packets P1, P2, . . . act exclusively in the attractive direction on the oscillator 101. This is indicated by the arrows of the force/time diagrams of FIGS. 1(a) and 1(b).

Figure 1A:
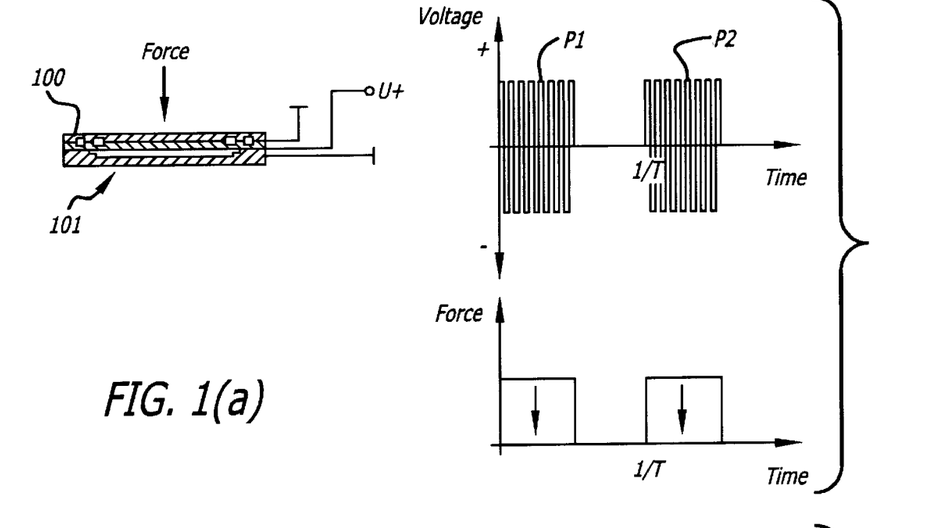
FIGS. 1(a) and 1(b) are representations, generally corresponding to those of FIGS. 4(a) and 4(b), of single-sided and two-sided excitation of an oscillator by phase or pulse-width controlled HF pulse packets without a DC voltage component respectively.
Figure 1B:
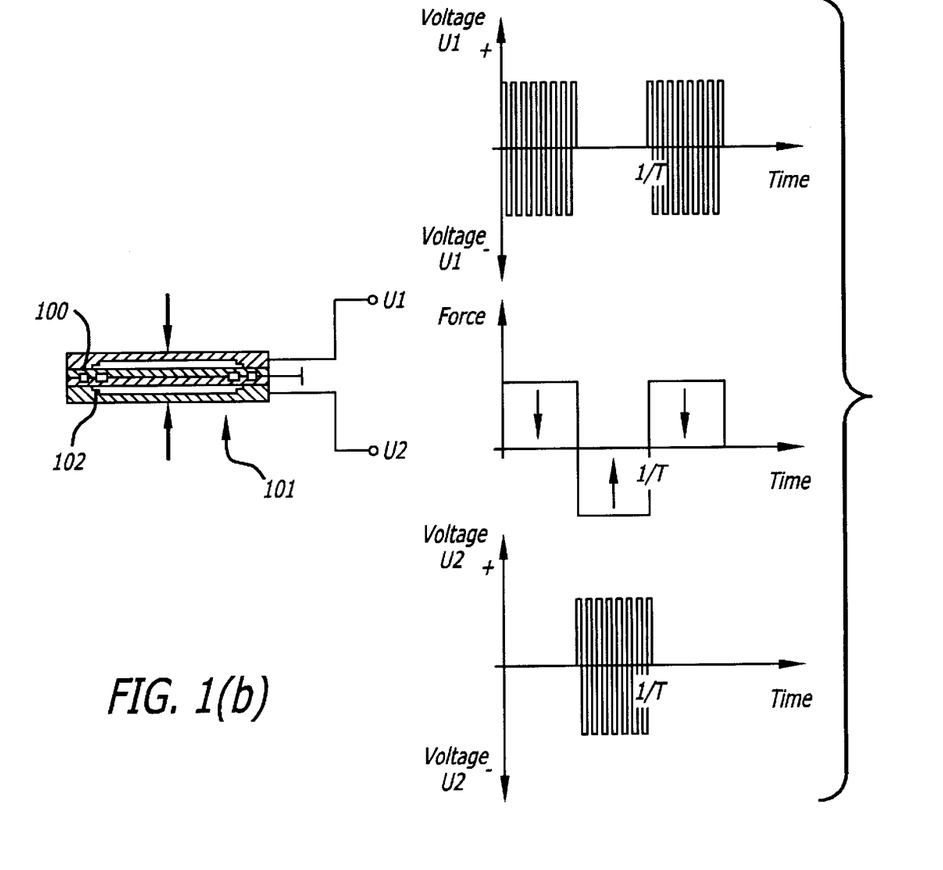
Figure 2A:
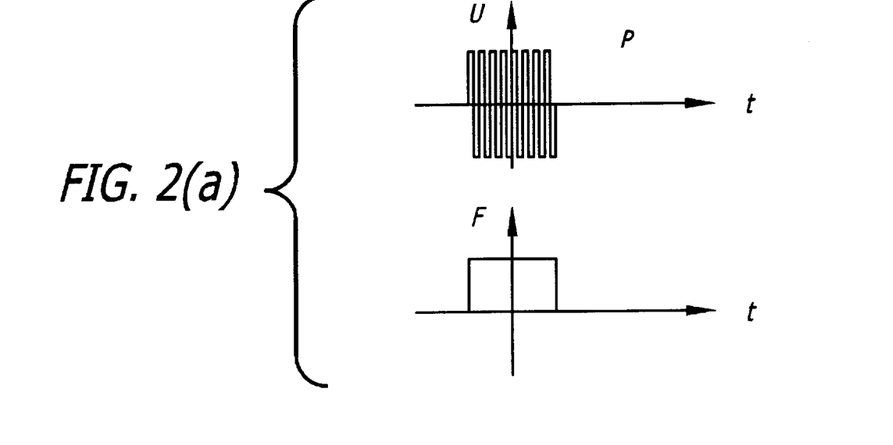
FIGS. 2(a) through 2(c) are a series of diagrams for explaining the variation of excitation of an oscillator in accordance with the invention.
Figure 2B:
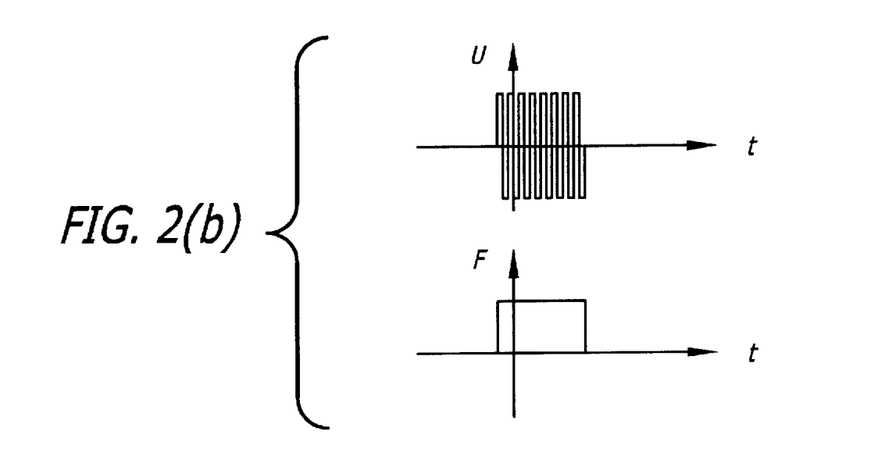
Figure 2C:
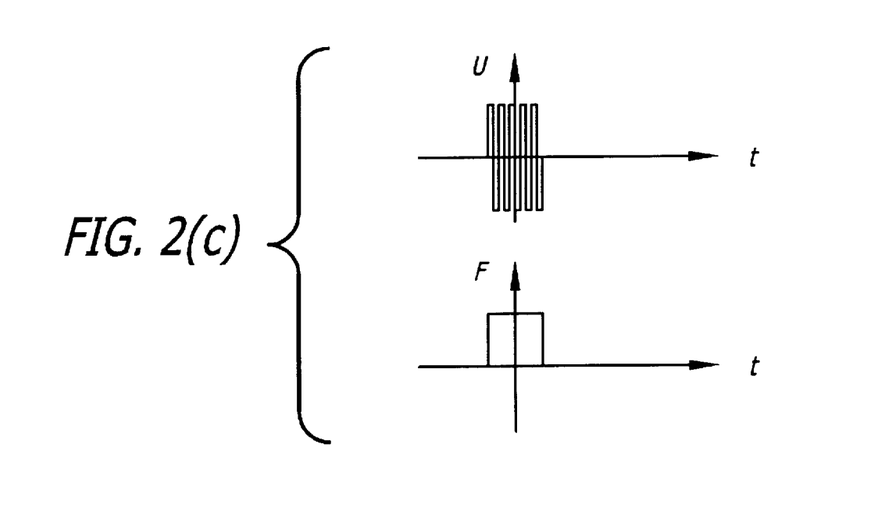

Should, as mentioned, the amplitude of the excitation signal that consists of the pulse packets P1, P2, . . . be kept constant, then an attractive angular impulse acts about the oscillator axis, or a force pulse acts in the oscillation direction.

FIGS. 2(a) through 2(e) are a series of diagrams for explaining variation of the excitation of a oscillator in accordance with the invention. Such diagrams show, in a way which is well understood by those skilled in the art, how the attractive force acting on the oscillator 101 (caused by a single pulse packet P) may be shifted (in terms of both width and phase) to achieve optimal resonant excitation of the oscillator. The phase and the width of the angular impulse or force pulse F may be simply affected (e.g., digitally) to control the oscillator system as a whole.

Figure 5:
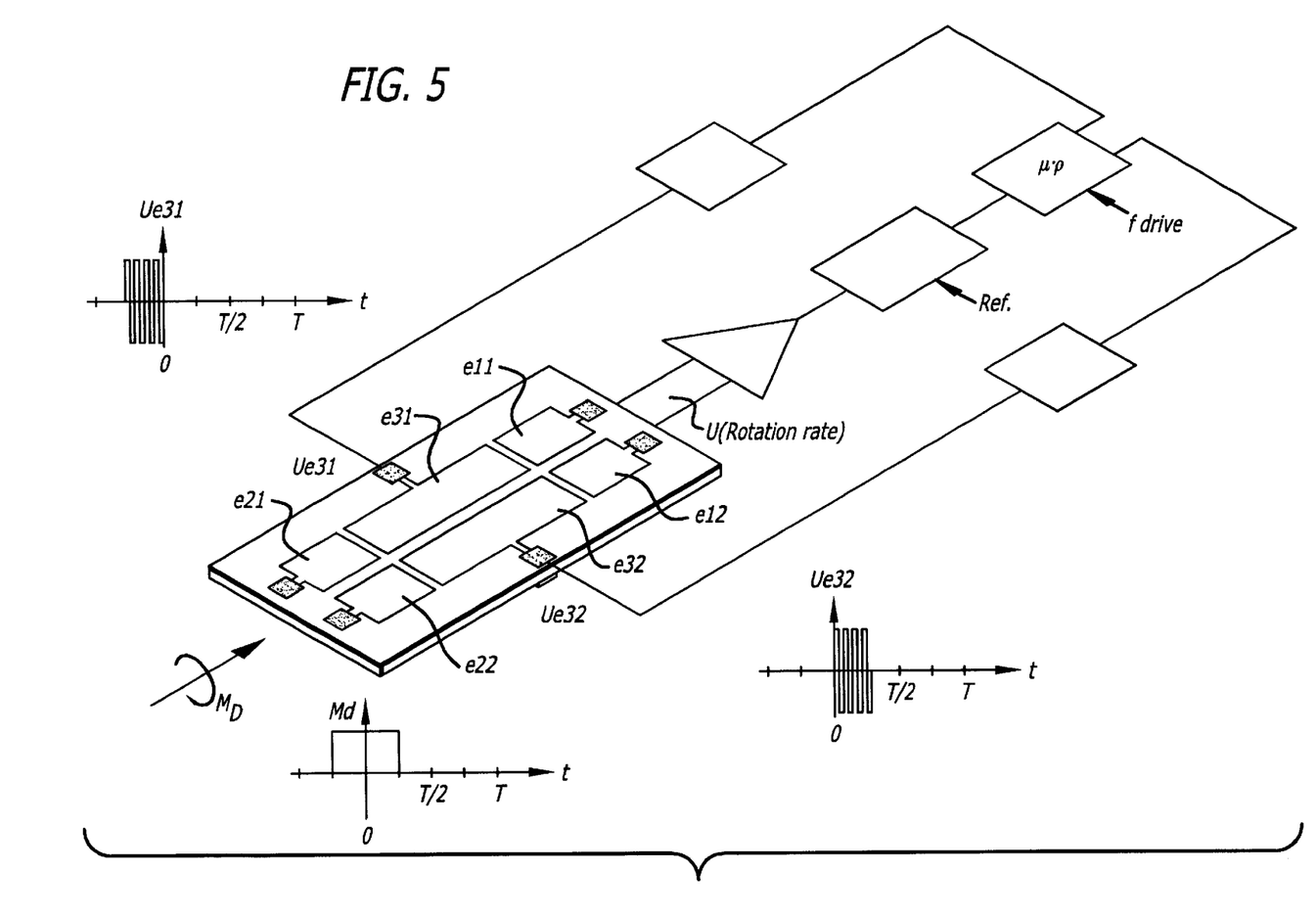
FIG. 5 is a schematic perspective view of a two-dimensional arrangement of electrodes for an oscillator, capable of being excited on a single or opposed sides of a micromechanical rotation rate sensor with speed control or rotation rate resetting, as described in U.S. Pat. No. 5,959,206.

Referring to FIG. 5, the moment $M_D$ or the force component produced by the electrostatic drive can easily be linearly varied by utilizing a greater or lesser number of periods per pulse packet.

Figure 3:
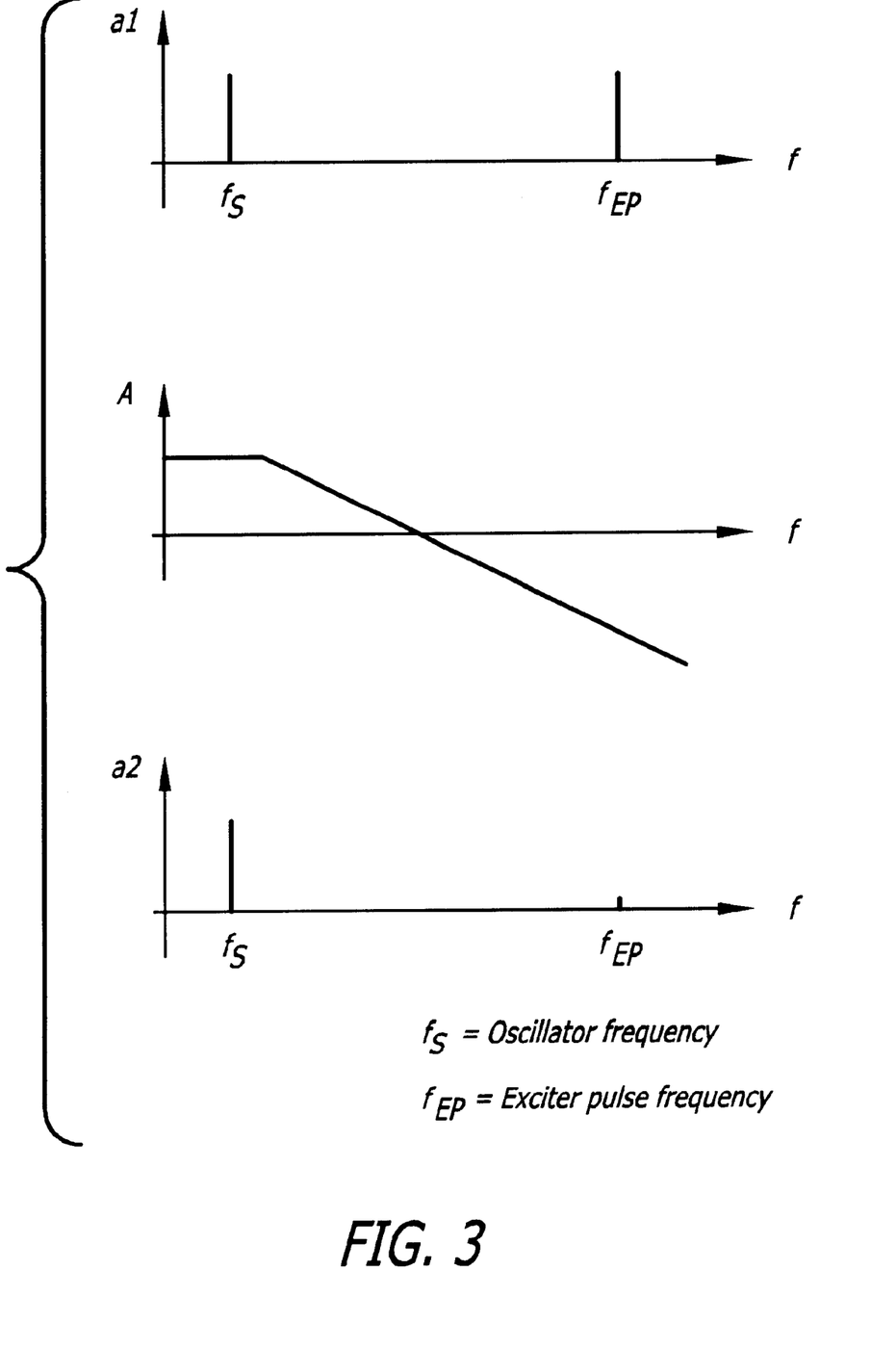
FIG. 3 is a set of diagrams that illustrate starting points for choosing the frequency of the HF excitation pulse packets in relation to the natural frequency of the oscillator.

As shown by FIG. 3, components of the HF excitation coupled to the sensor output can be screened out using filters over a suitably-chosen large frequency $f_s$ of the oscillator and the high frequency of the exciter pulse $f_{EP}$. This figure shows an illustrative embodiment for two-sided excitation of a plate oscillator with the middle curve showing the basic profile of a filtered read signal A.

By splitting up the excitation electrodes $e_{31}$, $e_{32}$ and the read electrodes $e_{11}$, $e_{12}$, as illustrated in FIG. 5, and employing a signal produced by reset electronics μP, it is possible to produce moments $M_D$ in the read axis (orthogonal oscillator axis) for the purpose of restoring the Coriolis acceleration generated displacements to zero (closed-loop principle).

Figure 6:
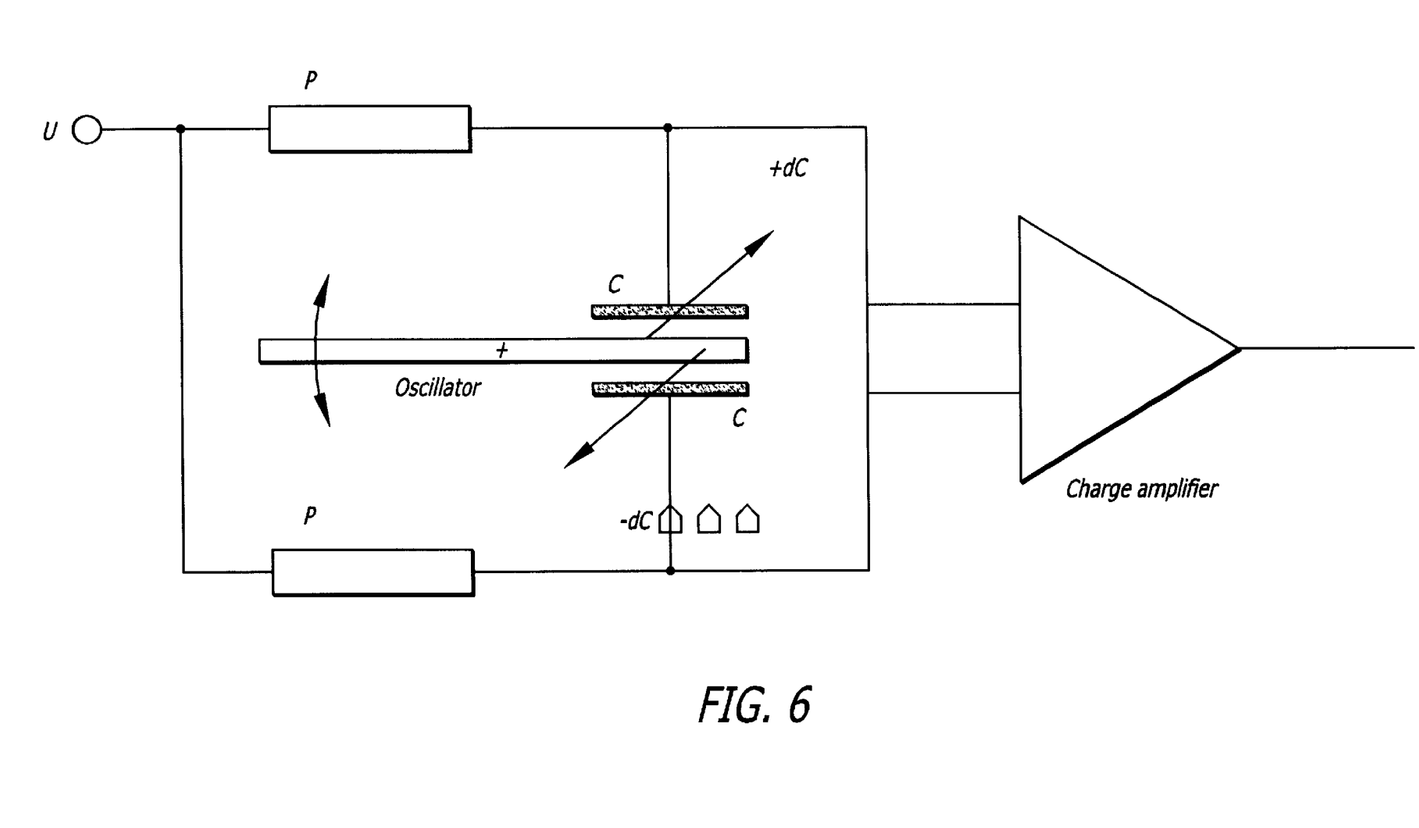
FIG. 6 is a schematic circuit diagram of a bridge circuit for reading a sensor signal for drive correction of the rotation rate signal.

The output of a Coriolis rotation rate sensor with resetting is proportional to oscillator speed. To maintain the sensor scale factor constant, oscillator speed should be kept constant. It is possible to use the variation of capacities of the drive capacitor or an electrode or an electrode pair to control the oscillator speed. A schematic design of a circuit for such purpose is shown in FIG. 6. In such case, the basis for directly reading the sensor signal is the shift in the charge±dQ due to the variation in one (or, in the example illustrated, in two or more) capacitor(s), it being possible to use both the drive electrodes $e_{31}$, $e_{32}$ as well as additional electrodes $e_{11}$, $e_{12}$ (cf. FIG. 5). The half or full bridge in such case is subjected to a constant DC voltage U.

Figure 7:
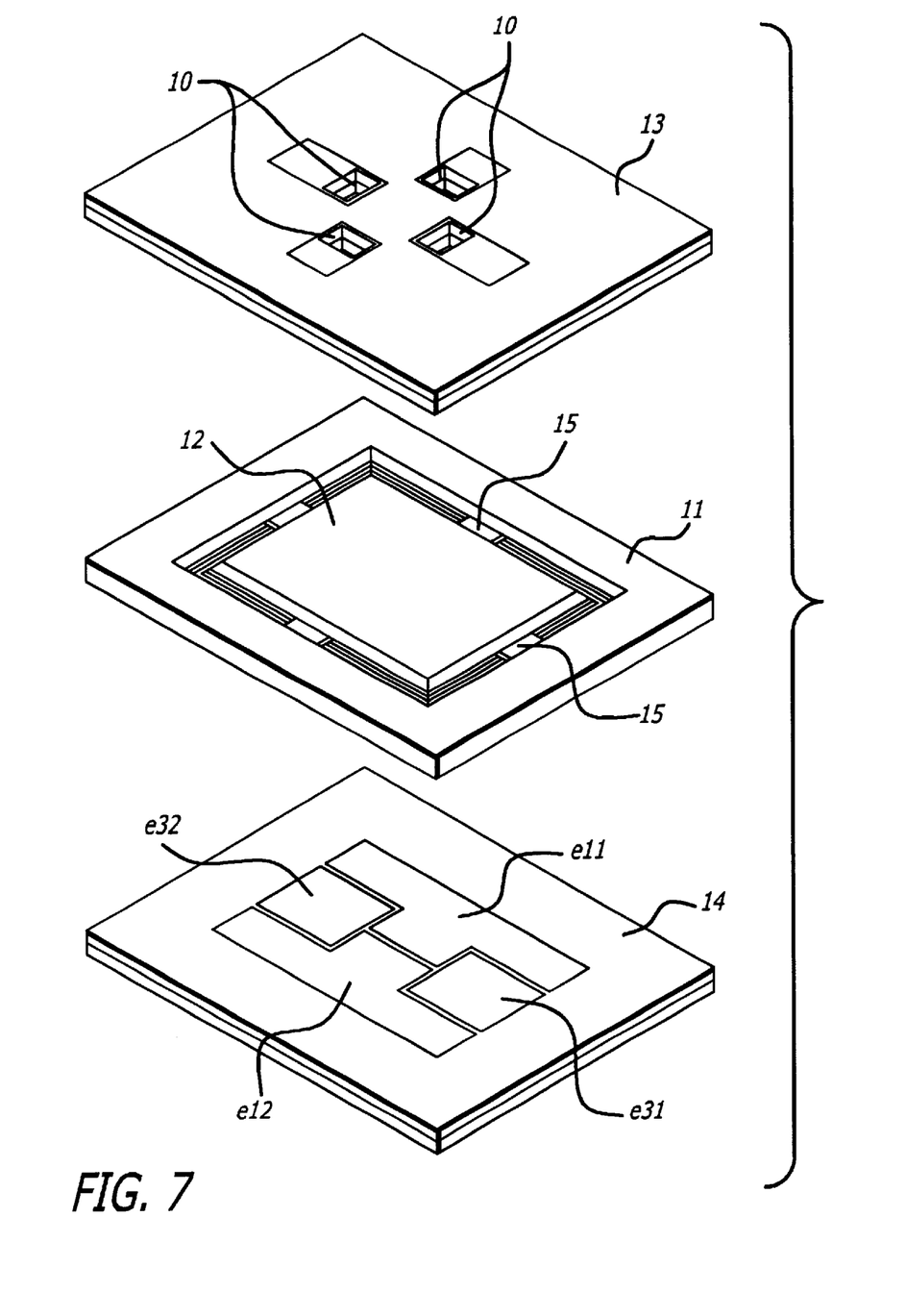
FIG. 7 is an exploded perspective view of a micromechanical rotation rate sensor based on the Coriolis principle that is suitable for the drive technique of the invention.

FIG. 7 is an illustrative embodiment of a micromechanical rotation rate sensor that is highly suitable for employing the excitation and read methods of the invention. Such sensor consists of three wafer layers—an upper cover plate 13, a lower cover plate 14 and a frame 11 therebetween. A plate-like oscillator 12 is held within the frame 11 by means of connecting pieces 15. (The electrode plates have been omitted from this view for the sake of clarity.) The upper and lower cover plates 13, 14 are arranged with mirror symmetry relative to one another. A two-dimensional distribution of the excitation electrodes $e_{31}$, $e_{32}$ or read or take-off electrodes $e_{11}$, $e_{12}$, with which contact can be made via feedthroughs 10, is represented on the inner face of the lower cover plate 14.

Figure 8A:
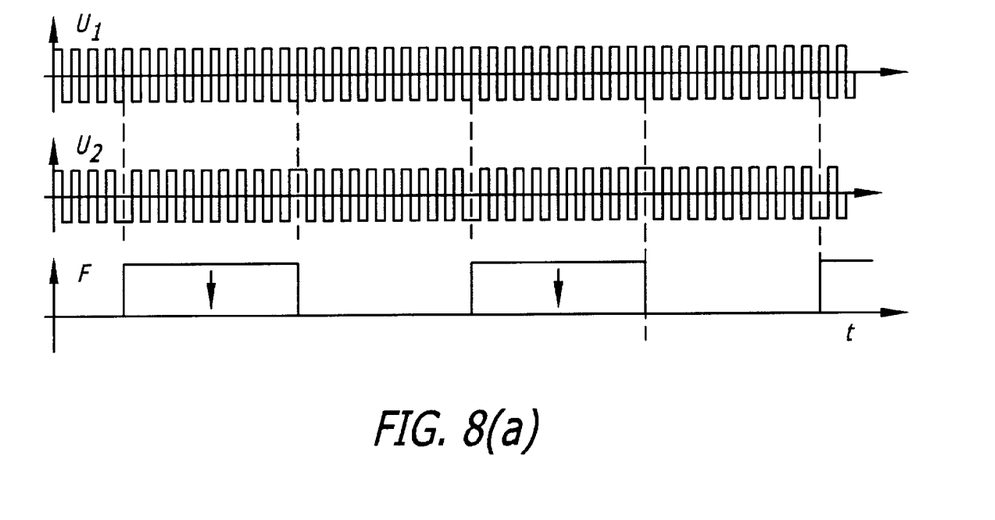
FIGS. 8(a) and 8(b), in combination, illustrate the principle of an alternative capacitive drive excitation for an oscillator with paired drive electrodes arranged symmetrically with respect to the oscillation axis wherein a first square-wave voltage U1 is applied to one electrode of the drive electrode pair, and a second square-wave voltage U2 of the same frequency is applied to the other electrode of the drive electrode pair.
Figure 8B:
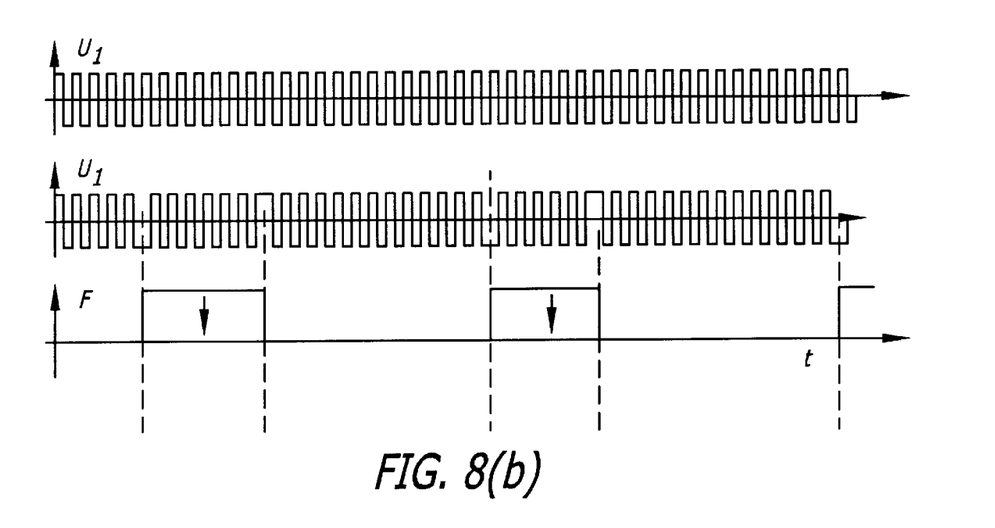

FIGS. 8(a) and 8(b), in combination, illustrate a further advantageous embodiment wherein the excitation is in each case carried out with equal-amplitude excitation voltages (i.e. square-wave voltages) on both electrodes of an excitation electrode pair. Should the excitation voltages U1 and U2 be in-phase, then no force component will be produced on the oscillator (i.e. this case corresponds to a zero force.) However, should the profile of the voltages U1 and U2 be exactly out-of-phase, this corresponds to a maximum force amplitude. By shifting the phase (e.g., in the case of the voltage U2, by antisymmetric shifting of the two voltages against each other or by additional phase changes), it is possible to adjust or control the force in discrete amplitude and phase values, as can be seen clearly in the time-based representation of FIG. 9 which illustrates how the drive force acting on the oscillator can be varied.

Figure 10:
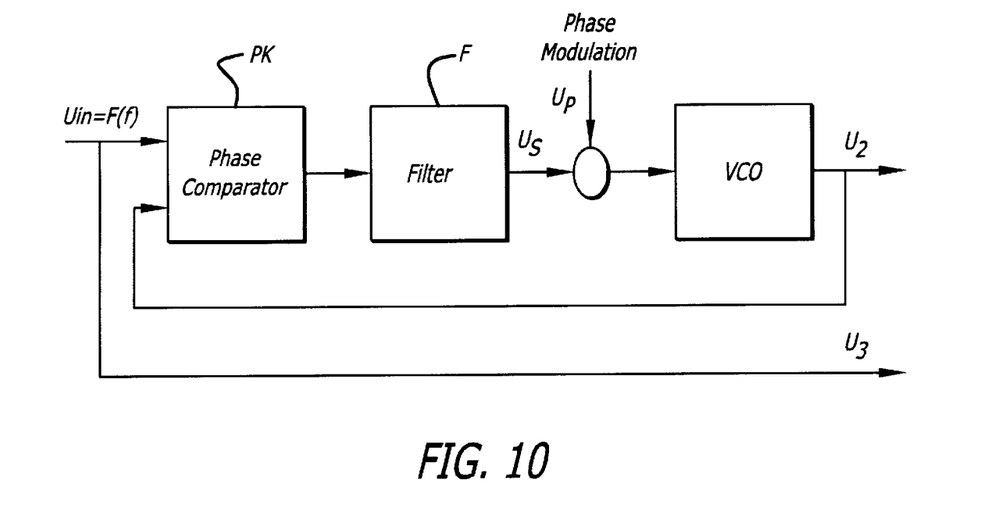
FIG. 10 is a schematic block diagram of the basic structure of an electronic drive or exciter circuit for producing the two exciter voltages U1 and U2 having a phase relationship controlled as a function of the natural frequency of the oscillator that is capable of being shifted continuously.

FIG. 10 illustrates the basic structure of a circuit with phase locked loop ("PLL") control for the phase angle of the two drive voltages U1 and U2.

Figure 9:
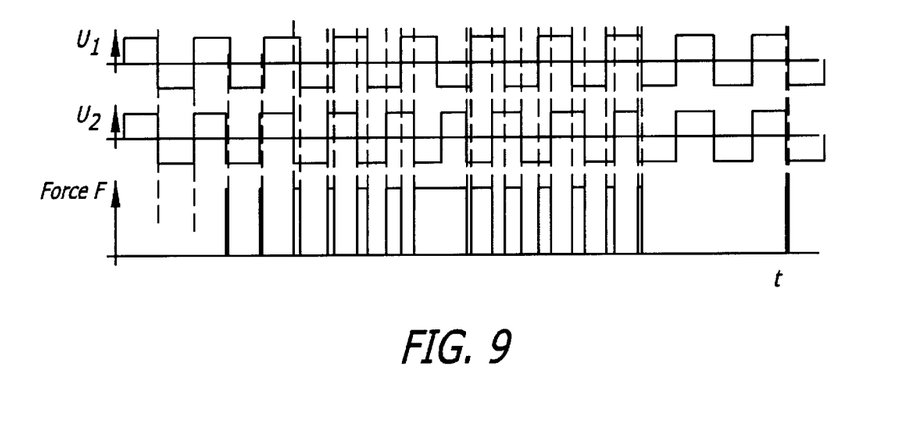
FIG. 9 is a series of timing diagrams that represent the two exciter voltages U1 and U2, as well as the resulting force components on the oscillators, illustrating how the respective force components are varied relative to one another by phase-shifting the voltages U1 and U2.

By employing the additional PLL circuit, it is possible to adjust the phase angle of the two drive voltages $U_1$ and $U_2$ continuously (cf. FIG. 9). A higher-frequency voltage $U_{in}$ is applied to an input of a phase comparator PK. By adding a phase-modulation voltage $U_p$ to a control voltage $U_s$, obtained via a filter F, of a voltage-controlled oscillator VCO, the phase of the output signal $U_2$ of the PLL circuit is shifted by ±π relative to the voltage $U_s$. The phase angle can thus be modulated with the sensor drive frequency. The resulting attractive force is $F=k(U_1-U_2)^2$. This attractive force is adjusted or controlled by the phase drive signal. In this way, it is possible, for example, to linearize a nonlinear second-order force excitation by a corresponding phase-modulation voltage.

The method of the invention for capacitive drive excitation has at least one of the following properties and affords the following advantages:

1. Use is made of the electrostatic attraction force between two differently-charged surfaces to excite the exciter oscillations. The alternating voltage for exciting the oscillations is of a frequency that is substantially higher than the natural frequency of the oscillator and free from DC or lower-frequency voltage components. A square-wave voltage with constant amplitude is preferably employed. By adding or subtracting one or more periods of the square-wave voltage, it is possible to vary the pulse width or pulse phase by processors to control the excitation of oscillations.

2. Should use be made of two square-wave exciter voltages of equal amplitude and frequency (applied to the electrodes of a symmetrically arranged drive electrode pair) the excitation of the oscillations can be varied by shifting the phase angles of the two drive voltages relative to one another. This has the advantage of not subjecting the excitation supply significantly to spurious frequencies due to the read frequency.

3. A restoring measurement arrangement can be obtained by splitting the drive signal in accordance with the rotation rate signal and (as illustrated in FIG. 5) applying it to correspondingly-split electrodes. Alternatively, should an additional signal be derived from the drive signal and split in accordance with a signal pick-off, it may be applied in parallel with the drive signal to an additional electrode pair $e_{21}$, $e_{22}$ (FIG. 5). The arrangement of the electrodes is, in the first case, chosen so that, in addition to driving about the drive axis or in the drive direction, it is also suitable for resetting the sensor signal in the read axis. In the second case, the separate electrode pair is provided merely for resetting. For a reset signal of zero, the split is therefore 1:1.

By compensating for the oscillator movements produced by rotation rates, it is thus possible to produce restoring systems (closed loop). A constant zero error can thus be compensated with comparative ease.

The discussion above is based on the use of voltage-time increments for exciting or controlling and restoring, and on the application of two excitation voltages that can be shifted relative to one another in terms of their respective phase angle. Solutions are also possible that involve signal processing techniques in which current-time increments or exciting alternating currents whose frequencies lie considerably above the natural frequency of the oscillator are employed capable of being phase-shifted relative to one another.

While this invention has been described with reference to its presently-preferred embodiment, it is not limited thereto. Rather, the invention is limited only insofar as it is defined by the following set of patent claims and includes within its scope all equivalents thereof.

What is claimed is:

1. A method for capacitive drive excitation of an oscillator for a sensor for capacitive measurement of predetermined inertial quantities by the determination of Coriolis forces comprising the steps of:
   a) applying a sequence of electrical pulses, tuned to the natural frequency of said oscillator, to a drive capacitor connected to said oscillator; and
   b) each of said pulses comprising a high-frequency pulse packet of constant-amplitude voltage.

2. A method as defined in claim 1, wherein the step of employing further comprises the step of employing a square-wave voltage with no DC component for said drive excitation using HF pulse packets.

3. A method as defined in claim 2, wherein the step of employing a square-wave voltage further includes the step of adjusting force pulses exerted on a plate-like sensor by said drive voltage by varying the width of each pulse packet.

4. A method as defined in claim 3 further including the step of varying the width and/or the phase of the voltage pulses of the pulse packets whereby the drive signal acting on a sensor is varied in the case of an arrangement of at least two excitation electrodes that are pairwise symmetrical with respect to the oscillation axis.

5. A method as defined in claim 3 further including the step of choosing the frequency of pulses which form said pulse packet to be substantially higher than the natural frequency of said oscillating sensing elements.

6. A method for the capacitive drive excitation of an oscillator in a sensor for capacitive measurement of predetermined inertial quantities by the determination of Coriolis forces, comprising the steps of:

a) applying a sequence of out-of-phase electrical pulse pairs tuned to the natural frequency of said oscillator to an arrangement of at least two excitation electrodes which is pairwise symmetrical with respect to the oscillation axis;

b) each of said pulses comprising the same constant-amplitude HF voltage;

c) choosing the frequency of said voltage to be substantially higher than the natural frequency of said oscillator; and d) producing said pulse pairs out-of-phase as HF pulse packets by controlled shifting of the phase of the HF voltage applied to one of the excitation electrodes with respect to that applied to the other of the excitation electrode pair to produce a particular resulting force of attraction on said oscillator.

* * * * *

UNITED STATES PATENT AND TRADEMARK OFFICE
CERTIFICATE OF CORRECTION

PATENT NO.     : 6,374,671 B1
DATED          : April 23, 2002
INVENTOR(S)    : Bruno Ryrko, Gunter Sphlinger and Walter Gutmann It is certified that error appears in the above-identified patent and that said Letters Patent is hereby corrected as shown below:

<u>Title page,</u>
Items [22] and [86], should read as follows:

-- [22]  PCT Filed      June 20, 1997
   [86]  PCT No.:       PCT/EP97/03257
         371 Date:      March 3, 1999
         102(e) Date:   March 3, 1999 --

Signed and Sealed this

Fifth Day of August, 2003

JAMES E. ROGAN
*Director of the United States Patent and Trademark Office*